UNITED STATES PATENT OFFICE 2,635,947

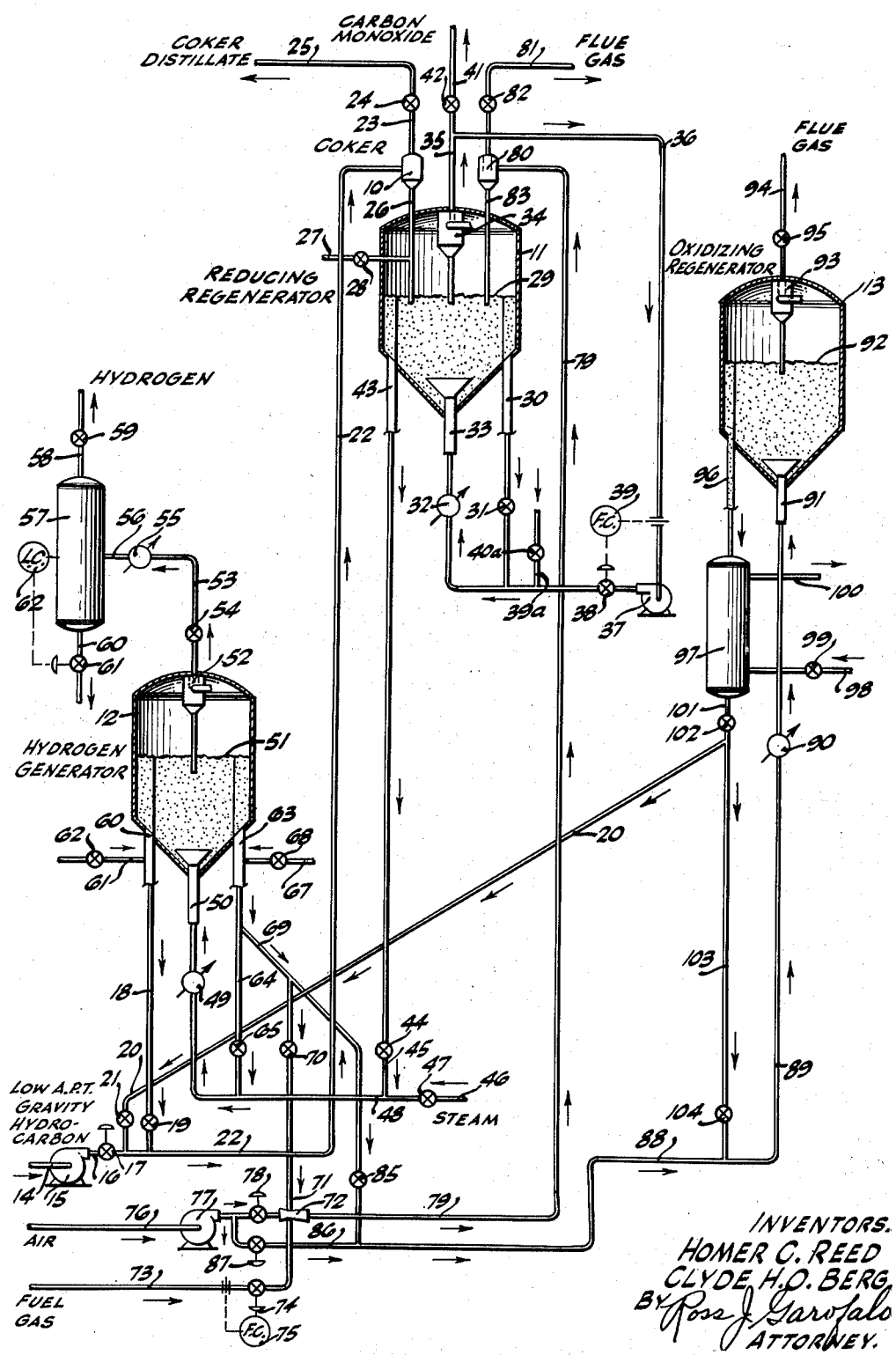

HYDROGEN PROCESS

Homer C. Reed, Glendale, and Clyde H. O. Berg, Long Beach, Calif., assignors to Union Oil Company of California, Los Angeles, Calif., a corporation of California Application July 2, 1948, Serial No. 36,723

17 Claims. (Cl. 23—214)

This invention relates to an improved process and apparatus for the production of hydrogen and in particular relates to an improved modification of the process for the generation of hydrogen by the reaction of iron or iron oxide with steam.

Hydrogen has heretofore been generated by the interaction of iron and steam according to the principles of the Messerschmidt process (U. S. Patent No. 971,206) in which a bed of sponge iron is heated to incandescence and then contacted with a blast of steam. The following reaction takes place:

$$2Fe + 3H_2O \rightarrow Fe_2O_3 + 3H_2$$

Following this first step the resulting iron oxide was then reduced by contacting the oxidized bed of iron with a reducing gas such as producer gas. Heat was supplied to the process and the step repeated, more hydrogen being produced.

This process had a number of disadvantages, among them being the relatively low degree of conversion of iron to iron oxide during the hydrogen production step, the poor heat and gas flow distribution in the bed of solids during operation, the problems encountered wherein the iron had a tendency to sinter or agglomerate with the resultant formation with larger iron particles than desirable and a decrease in active surface area of the metal, and others. Another difficulty was encountered in the deposition of carbon and the formation of carbides during the iron oxide reduction with a producer gas. These impurities subsequently reacted with the steam at high temperatures to form carbon monoxide as well as some hydrocarbons which contaminated the hydrogen product.

These difficulties and disadvantages have been substantially overcome by the process and apparatus of the present invention as hereinafter more fully described. The difficulties formerly encountered with regard to heat flow and iron conversion have been overcome by employing a fluidized bed of solids in which a continuous contact of reacting gases with the finely divided solids is effected. In the hydrogen generation step in which iron or ferrous oxide reacts with steam to form higher iron oxides and hydrogen and in the reducing step in which the higher oxides of iron are converted to elemental iron or lower oxides, precise temperature control is effected and the desired reactions are substantially carried out to the desired products. By this means, the problems encountered due to iron sintering with resultant loss of reactant solid surface area and the formation of troublesome iron impurities such as those described above which contaminate the hydrogen product have been eliminated. The process, when carried out in the apparatus of this invention, operates smoothly and efficiently with a maximum production of high purity hydrogen as hereinafter more fully described.

A primary object of this invention is to provide an improved process for the production of high purity hydrogen through the reaction of steam with a metal or an oxide of a metal above hydrogen in the electromotive series of metals forming an oxide capable of reduction with carbon.

A further object of this invention is to provide methods for effecting the reaction of iron and steam at elevated temperatures by means of which effective temperature control and elimination of undesirable contaminants from the hydrogen product are permitted.

It is another object of this invention to provide an improved method for reducing higher oxides of iron formed in the reaction of steam with water by means of which iron-carbon impurities are substantially eliminated.

A further object of this invention is to provide a combined process for the utilization of low A. P. I. gravity hydrocarbon fractions and the generation of hydrogen from the reaction of steam with iron.

It is a further object of this invention to provide a process for hydrogen generation by reacting a lower oxide of a metal such as ferrous oxide with water or steam forming the higher oxide and subsequently reducing the higher metal oxide such as $Fe_2O_3$ with carbon to ferrous oxide.

It is another object of this invention to provide an improved combination process for the continuous coking of low A. P. I. gravity hydrocarbon fractions in the presence of a carbon reducible metal oxide in a higher oxidation state, the subsequent treatment of the coke-laden higher oxide particles at an elevated temperature to remove coke and effect a reduction of the higher oxide particles to a lower oxidation state, and the employment of the reduced particles thus formed as a reagent for the reaction with steam at elevated temperatures for the production of high purity hydrogen.

It is also an object of this invention to provide an improved process for the reduction of metallic oxides such as higher iron oxides and the like wherein a low A. P. I. gravity hydrocarbon fraction is coked in the presence of reducible metallic oxide in a fluidized system and the resultant coke-laden metallic oxide subsequently treated at high temperatures in a second fluidized system for the substantially complete reduction of the metallic oxide to any desired lower oxidation state.

It is also an object of this invention to provide an apparatus adapted to effecting the aforementioned objects.

Other objects and advantages of this invention will become apparent to those skilled in the art as the description and illustration further proceeds.

Briefly, the present invention comprises in its preferred modification heating a hydrocarbon fraction in the presence of particles of a carbon reducible metallic oxide, passing the resultant mixture into a fluidized coking zone in which thermal pyrolysis of the hydrocarbons is effected forming coke-laden metallic oxide particles and a coker distillate comprising decomposition products of the hydrocarbon, subsequently treating the coke-laden particles of metal oxide at an elevated temperature in a fluidized reducing zone wherein the coke-laden metallic oxide is converted to a gas containing carbon monoxide or carbon dioxide and the finely divided particles containing the metal in a lower oxidation state which may be the elemental metal or a lower oxide, combining the reduced solid particles thus formed with steam and reacting the two in a fluidized zone wherein the higher oxidation product of the metal is formed together with hydrogen, separating the hydrogen thus formed from the oxidized metal and recirculating the particles of oxidized metal together with the hydrocarbon to the fluidized coking stage previously named. In this manner, the change in the oxidation state of a carbon reducible element above hydrogen in the electromotive series of metals is employed to effect the decomposition of water for hydrogen production. This material is also employed to effect the thermal decomposition of a gaseous or liquid hydrocarbon fraction such as natural gas, naphthas, gas oils, kerosenes, crude oil, uncracked or cracked residuum, lubricating oil or other hydrocarbon oil extracts, shale oil, or shale oil fractions, coal tars and coal tar distillate fractions, tar sand oils or oils recovered from other solids such as diatomite, or the like.

The elements whose oxidation state is changed in this process for hydrogen production may comprise a metal above hydrogen in the electromotive series of metals since all of these are theoretically capable of decomposing compounds of hydrogen and liberating hydrogen therefrom. These metals include lead, tin, nickel, cobalt, cadmium, iron, chromium, zinc, manganese, aluminum, beryllium, magnesium, calcium, barium, strontium, sodium, potassium, rubidium and lithium. Of this group of metals it is preferable to employ particles of metallic zinc, manganese, iron, cobalt, nickel, or mixtures thereof or lower oxides thereof since these metals and oxides according to the process of this invention have suitable reaction rates with water or steam and at the same time form oxidation products which are readily reducible with carbon according to the methods employed in this invention. It is preferred to employ iron or ferrous oxide in the reaction of steam for hydrogen production and the formation of a higher oxide of iron, either $Fe_3O_4$ or $Fe_2O_3$ or mixtures thereof, and it has been found that this oxidation product is readily reconverted to the elemental iron or ferrous oxide according to the process of this invention for reuse. The above statements regarding the preferred metals or compounds for hydrogen generation are not intended to restrict this invention to use with that particular metal or its compounds since the process has been found readily operable with metals or oxidizable compounds of metals listed in the broader description above.

It is preferred to employ ferrous oxide (FeO) as the lower metallic oxide to decompose water in the hydrogen generation step of this process. It has been found that in elevated temperature treatments, ferrous oxide exhibits no tendency to agglomerate, sinter, or otherwise loose its active surface area. In the following description of the process of this invention, ferrous oxide is used with water vapor to generate hydrogen.

The process of the present invention may be more readily understood by reference to the accompanying schematic flow diagram which will be described in the form of an example reciting flow quantities, temperatures, pressures, as well as the preferred ranges of these operating variables in an operation in which ferrous oxide (FeO) is employed as the reagent for water vapor decomposition although it should be understood that elemental iron may also be employed in the same manner.

In the accompanying drawing a schematic flow diagram of the process according to this invention is presented employing coker 10, reducing regenerator 11, hydrogen generator 12 and oxidizing regenerator 13. During the coking a certain amount of sulfides of iron are formed which are oxidized in oxidizing regenerator 13 to $Fe_2O_3$. In the reducing regenerator, iron oxides formed in the conversion of the iron sulfides and in the reaction of lower oxides of iron or elemental iron with water in hydrogen generator 12 are reduced at an elevated temperature to form elemental iron or a lower iron oxide such as ferrous oxide in this modification.

The low A. P. I. gravity hydrocarbon treated according to the process of this invention is in this example a topped residuum obtained from a Santa Maria Valley (California) crude oil having a gravity of approximately 15° A. P. I. This hydrocarbon is introduced by means of line 14 and is pumped by means of pump 15 through line 16 at a rate of 350 barrels (42 U. S. gallons per barrel) per day and is combined with 150 tons per day of coke-free iron oxide of which about 80% is passed via line 18 controlled by valve 19 from hydrogen generator 12 and about 20% from oxidizing regenerator 13 via line 20 controlled by valve 21 at about 1600° F. In general the weight ratio of circulated solids to hydrocarbon coking stock may vary from as low as about 5 to as high as about 50 and the ratio under preferred operating conditions is between about 25 and 45, these conditions including the quantity of circulated solids from the coker when coking in the presence of fluidized particles is employed. The weight ratio of coke-free iron oxide to coking stock is usually between 1.0 and 10 in fluidized coking operations. The iron oxide laden hydrocarbon stream passes via line 22 into coker 10.

HYDROCARBON OIL COKING

In one modification of the coking step of the process according to this invention the temperature of the hydrocarbon stream and of the higher iron oxide stream is sufficient to effect a substantially complete thermal pyrolysis of the hydrocarbon while the hydrocarbon is conveyed via line 22 into coker 10. In the present operation, for example, the higher iron oxides at about 1600° F. are combined with the incoming hydrocarbon stream at temperatures of about 750° F., in such a proportion that a hydrocarbon stream is raised to temperatures between about 700° F. and 1200° F. sufficient for thermal decomposition as hereinafter described. Under these conditions coker 10 may comprise a suitable separator such as the cyclone type in which the lower boiling hydrocarbon products of the thermal pyrolysis are removed via line 23 controlled by valve 24 at a rate of about 300 barrels per day. This comprises the coker distillate which is subsequently conveyed by means of line 25 to fractionation facilities or storage or other uses, not shown. The coke-laden particles of iron oxide which may be $Fe_3O_4$ or $Fe_2O_3$ or mixtures thereof, are removed from the lower end of coker 10 and pass via line 26 into reducing regenerator 11.

In another modification of the coking operation, coker 10 may comprise a fluidized vessel in which suitable circulation of gases or vapors maintain the coke-laden particles of the higher iron oxide and the entering particles of iron oxide in a state of hindered settling by means of which a dense phase suspension of these particles in hydrocarbon gases and vapors is maintained. A level is established below which a suspension phase exists having a bulk density which is appreciably greater than the density of the vaporized hydrocarbons due to the suspended solids present and in which the solids are coated with coke. In this modification the operation is such that a continuous countercurrent contact of suspended iron oxide particles with the hydrocarbon stream is effected at coking temperatures and a highly efficient coating of each particle with coke results. By withdrawing a portion of the fluidized phase and recirculating this material together with incoming oil and solids in the above-mentioned ratio through a heat exchange mechanism to supply heat, a precise control of the coking temperature may be effected.

Either of the aforementioned coking steps may be employed.

From coker 10 coker distillate vapors are withdrawn and sent to storage or further processing facilities, not shown, and coke-laden particles of iron oxide pass downwardly through line 26 into reducing regenerator 11. In order to effect a substantially complete stripping of the coke-laden solids, a stripping gas is introduced via line 27 controlled by valve 28 into line 26. This stripping gas may comprise steam, natural gas, producer gas or similar materials which pass upwardly through line 26 and effect a counter-current stripping of residual hydrocarbons present. The material ultimately discharged from line 26 into reducing regenerator 11 comprises a dense phase of coke-laden particles of iron oxide. This stream in the present operation amounts to 160 tons per day and comprises 6.3% coke.

REDUCING REGENERATION

The coke-laden oxides of iron are introduced in a continuous stream into reducing regenerator 11 which is operated at a temperature of about 1200° F. and at a pressure of 30 pounds per square inch. This operation may be conducted at pressures considerably higher than the one cited, but preferably at no pressure less than this for reasons of control. Suitable temperatures for operating reducing regenerator 11 range from as low as 1,000° F. to as high as 1500° F. or higher. Reducing regenerator 11 is a vessel containing fluidized solids in which the coke-laden iron oxide particles are maintained in a state of hindered settling by means of which suspension level 29 is established and maintained. A portion of the suspended solids are removed from reducing regenerator 11 by means of line 30 controlled by valve 31. These are suspended in a portion of the producer gas formed in reducing generator 11 and returned through heat exchange means 32 via line 33. This circulation maintains the fluidized suspension of solids in the reducing gases and permits precise temperature control and control of the composition of solids ultimately produced from the reducing regenerator. A controlled amount of an oxygen-containing gas such as air may be introduced into this recycle stream via line 39a controlled by valve 40a, or it may be directly injected into vessel 11. This gas is required to aid in oxidizing the coke to carbon monoxide.

The gaseous products of the reaction collect in a state relatively free of suspended solids above level 29 in reducing regenerator 11. These gases in the preferred operation according to this invention comprise mainly a mixture of carbon monoxide, hydrogen, carbon dioxide, water and nitrogen. The preferred form of operation is such that a carbon monoxide to carbon dioxide ratio of at least 1.0 is maintained to insure a substantially complete reduction of the higher iron oxides to ferrous oxide (FeO). In other modifications of this invention, increasing carbon monoxide to carbon dioxide ratio to as high as about 3.0 or higher insures the reduction of the higher oxides of iron substantially completely to elemental iron which may be employed subsequently in hydrogen generator 12 for the reduction of water vapor.

Positioned in the upper portion of reducing regenerator 11 is separator 34 into which the gases referred to above are introduced and by means of which remaining traces of suspended solids are removed. The gases are withdrawn therefrom by means of line 35 and a portion is recirculated through the regenerator at a rate of 1440 M s. c. f. per day via line 36 by means of blower 37 controlled by valve 38 which in turn may be actuated by flow controller 39. This gas flows by means of line 40 and is combined with the solids removed from reducing regenerator 11 by means of line 30 described above and is recirculated into the fluidized vessel. This recirculation of carbon monoxide-bearing gas in which the carbon monoxide to carbon dioxide ratio has a specific value is of considerable importance of successful operation of the reducing regenerator. By controlling the rate of this gaseous recycle, the degree of contact of coke-laden iron oxide particles may be varied and by carefully controlling the carbon monoxide concentration with respect to the carbon dioxide concentration the composition of the reduced iron compounds removed from the regenerator may be controlled. Excess quantities of this carbon monoxide containing gas are removed from separator 34 by means of lines 35 and 41 controlled by valve 42. This material comprises a producer gas which may be sent to storage or further processing facilities not shown, or in the preferred modification of this invention is employed as fuel in the process.

At the temperatures of operation employed in reducing regenerator 11 a substantially complete reduction of the higher oxides of iron is obtained in which the carbon present on the individual iron oxide particles apparently reacts directly to form carbon monoxide and a lower oxide of iron. The countercurrent contact offered to the resulting lower oxide of iron, which in this modification comprises ferrous oxide, by the recirculated gas stream described above, in which a specific concentration ratio of carbon monoxide to carbon dioxide is maintained, insures a substantially complete reduction of the iron oxides to the desired lower oxide or to the elemental iron state.

In this modification the ferrous oxide is removed from reducing regenerator 11 by means of line 43 controlled by valve 44 at a rate of 204 tons per day. This material has the following analysis:

*Table*

| Component: | Weight per cent |
|---|---|
| FeO | 76.2 |
| $Fe_3O_4$ | 20.3 |
| FeS | 3.4 |
| C | 0.1 |
| | 100.0 |

The ferrous oxide produced as above described and having the foregoing composition passes via line 45 and is combined with steam or water introduced by means of line 46 controlled by valve 47 at a rate of about 26,000 pounds per day. Since the iron oxide removed from regenerator 11 via line 43 is at a temperature of about 1200° F., efficient utilization of its sensible heat may be obtained by combining it directly with liquid water under a pressure of about 30 pounds per square inch. The steam thus formed is sufficient to suspend the ferrous oxide by means of which it is introduced via line 48 through heat exchange means 49 whereby temperature control of recirculated solids is maintained, and subsequently through line 50 into hydrogen generator 12. It may be desirable to employ the sensible heat of the ferrous oxide stream removed from reducing regenerator 11 in other services such as pre-heating the recirculating carbon monoxide stream and the like. In this instance the heat may be recovered in a suitable waste heat boiler to cool the solids. Steam may then be introduced via line 46 controlled by valve 47 to suspend the cooled ferrous oxide particles directly.

HYDROGEN GENERATION

Hydrogen generator 12 is operated with a net upflow of gases introduced via line 50 which comprise steam containing suspended ferrous oxide together with some iron sulfide. In this manner the solid particles are fluidized and maintained in a condition of hindered settling which establishes level 51 below which the dense phase, wherein the reaction occurs, exists. A continuous countercurrent contact of ferrous oxide and iron sulfide with steam is effected at a temperature of about 1200° F. although temperatures below about 800° F. to 900° F. to higher than 1500° F. may be employed. The pressure of operation in this modification is about 30 pounds per square inch, although higher pressures may be employed, if desired.

Below level 51 in hydrogen generator 12 the following reaction between steam and ferrous oxide occurs:

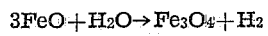
$$3FeO + H_2O \rightarrow Fe_3O_4 + H_2$$

At these operating temperatures, a complex reaction also takes place between the steam and the iron sulfide particles during which further quantities of hydrogen are formed together with small amounts of hydrogen sulfide and considerable quantities of sulfur. About 30% to 40% of the sulfur present as iron sulfide introduced into the hydrogen generator is converted to elemental sulfur and removed with the gaseous product. Some of the solids remaining apparently are at least partially converted to a solid compound or compounds of iron, sulfur and oxygen. The nature of the material thus formed has not been accurately determined, but it is believed to be an iron sulfite or an iron thiosulfate or a combination of these or like materials. These complex solid compounds are readily oxidizable in the oxidizing regenerator in which iron sulfides are converted to higher iron oxides forming sulfur dioxide.

The hydrogen thus formed together with unreacted water vapor and sulfur vapor accumulates in the upper portion of hydrogen generator 12 above level 51 and is passed through separator 52 wherein remaining traces of suspended solid particles are removed and returned to the lower part of the vessel below level 51. The hydrogen product is removed from separator 52 via line 53 at a rate controlled by valve 54 which serves to maintain operating pressure in hydrogen generator 12. The hot gases thus formed comprise a mixture of hydrogen, sulfur and steam at a temperature of about 1200° F. and pass at a rate of 26 M s. c. f. per hour into heat exchange means 55 which may comprise a steam superheater serving to raise the temperature of steam introduced into the generator. Ultimately the temperature of these gases is decreased sufficiently to permit condensation of the sulfur formed as above indicated separately from the water. The entire gas mixture may be cooled to effect condensation of both the sulfur and the unreacted water vapor and the cooled mixture passes by means of line 56 into separator 57. Hydrogen, substantially free of water vapor, is removed therefrom by means of line 58 at a rate controlled by valve 59 while unreacted water containing condensed sulfur particles as a condensate passes via line 60 controlled by valve 61 which in turn is actuated by liquid level controller 62. The sulfur may be readily separated by sedimentation, filtration or other well known means and the water may be returned for revaporization to supply steam requirements. The hydrogen thus produced on the water-free bases amounts to 11.5 M s. c. f. per hour and a 44% steam decomposition is effected under these particular operating conditions.

Hydrogen generator 12 is provided with means for withdrawing the higher iron oxides as well as complex iron - sulfur - oxygen compounds formed as products of the reaction of water vapor with ferrous oxide and iron sulfide. These outlets are further provided with steam seals by means of which the solid particles may be withdrawn continuously without the loss of hydrogen from hydrogen generator 12 or the introduction of undesired gases. Steam is introduced into outlet 60 by means of line 61 controlled by valve 62. The solids are thus removed via line 18 at a temperature of between about 1000° F. and 1600° F., controlled by valve 19 to be combined with incoming low A. P. I. gravity hydrocarbon fraction to be coked. The mixture is subsequently introduced into coker 10 as previously described. The remaining portion of higher oxide of iron produced in hydrogen generator 12 is removed via line 63.

The main body of the higher oxides of iron thus removed passes by means of line 64 controlled by valve 65 and is combined with the lower oxides of iron and steam introduced by means of line 48. The combined stream passes by means of line 66 and is recirculated into hydrogen generator 12. The circulation of gases containing these suspended solids serves to maintain level 51 in the hydrogen generator, the efficient countercurrent contact of fluidized solids and gases and the precise temperature control over the hydrogen generation reaction.

The greater portion of higher oxides of iron removed from hydrogen generator 12 pass through outlet 63 into which passes the steam as a sealing gas by means of line 67 controlled by valve 68. As above disclosed, most of the material thus withdrawn is recirculated to the hydrogen generator while the remaining portion passes via line 69, controlled by valve 70, at a rate of 110 tons per day and is introduced by means of line 71 into burner 72. A fuel gas, which may comprise part of a producer gas produced from reducing regenerator 11 or it may comprise a hydrocarbon gas, is introduced into burner 72 by means of line 73 at a rate controlled by valve 74 in turn actuated by flow controller 75. Air is supplied to the burner by means of line 76 and blower 77 controlled by valve 78. The heat liberated in combustion raises the temperature of the higher oxides of iron from about 1200° F. to about 1600° F. The higher oxides of iron are suspended in the hot flue gases thus formed and pass via line 79 upwardly into separator 80 wherein the solids are separated from the flue gas. The flue gas is removed therefrom via line 81 controlled by valve 82 and the precipitated solids pass by means of line 83 into reducing regenerator 11 where they are admitted below level 29 into the fluidized phase present in that vessel. The higher oxides of iron are thus returned to the reducing regenerator at a rate of 160 tons per day and serve to supply heat required in the reducing regenerator.

OXIDIZING REGENERATION

When the process of this invention is carried out using a low A. P. I. gravity hydrocarbon fraction containing hydrocarbon compounds of sulfur an active desulfurization of the hydrocarbon material is effected in the coking operation with the resultant formation of iron sulfides. This is the particular case involved in treating Santa Maria Valley (California) crude petroleum or residuums thereof and oxidizing regenerator 13 is provided in order to prevent undue concentration of iron sulfides and iron compounds of sulfur and oxygen from building up in the system. The oxidizing regenerator oxidizes these compounds of iron under high temperature conditions to form gases containing sulfur or sulfur dioxide and leaves higher iron oxides, mostly $Fe_2O_3$.

In order to effect iron sulfide conversion, 41 tons per day of solid material withdrawn from hydrogen generator 12 by means of lines 63 and 69 is passed via line 84 controlled by valve 85 and is subsequently combined with 38 M s. c. f. per hour of air under pressure from blower 77 in line 86 at a rate controlled by valve 87. The suspension of iron sulfide, iron sulfite and iron oxide in air passes via line 87 wherein it is combined with a recycle stream of iron oxide withdrawn from oxidizing regenerator 13. The combined streams are subsequently passed by means of line 89 as a suspension through heat transfer means 90 and are introduced by means of line 91 into oxidizing regenerator 13. The operation of oxidizing regenerator 13 is that of a fluidized process in which level 92 is maintained wherein a continuous countercurrent contact of iron sulfide with air is effected. The temperature of this operation is about 1200° F. and 2,300 M. B. t. u. per hour of heat is liberated, although temperatures of from about 1000° F. to about 2000° F. may be employed. This heat is dissipated in heat exchange means 90 which may be employed to generate high pressure steam for use in the remainder of the process or it may be employed to preheat incoming streams or recycle streams employed within the process. Below level 92 in oxidizing regenerator 13 the suspended particles of iron oxide and iron sulfides are maintained in a condition of hindered settling and a substantially complete oxidation of the iron sulfides and other solids is effected. The resulting gases collect in the portion of the vessel above level 92 and are passed through separator 93 which serves to separate the remaining suspended solids and return them to a position below level 92. The solids-free sulfur dioxide-bearing flue gases are then passed via line 94 controlled by valve 95 and are disposed of or sent to further processing facilities not shown. In one modification of this process, not shown in the drawing, carbon monoxide produced from reducing regenerator 11 may be combined with the flue gas produced from oxidizing regenerator 13 in the proper proportion and reacted to convert the sulfur dioxide to elemental sulfur which may be recovered as a liquid or as a finely divided solid. Iron sulfide and lower iron oxides are converted in oxidizing regenerator 13 to $Fe_2O_3$ which is removed therefrom at a rate of 41.5 tons per day via line 96. These solids pass by means of line 96 into vessel 97 which is provided with baffle plates or other means whereby a countercurrent contact of a downwardly flowing solid with an upwardly flowing gas may be effected. Vessel 97 comprises an auxiliary reducer wherein ferric oxide $Fe_2O_3$ is reduced to $Fe_3O_4$ by the action of a gas containing a substantial proportion of carbon monoxide which is introduced by means of line 98 controlled by valve 99. This gas may comprise a portion of the carbon monoxide bearing gas produced in reducing regenerator 11 or it may comprise a producer gas separately prepared. This gas is introduced into auxiliary reducer 97 at a rate of 12 M s. c. f./hr. and the effluent gases are removed therefrom by means of line 100.

The reduced solids from auxiliary reducer 97 are withdrawn therefrom at a rate of 460 tons per day via line 101 controlled by valve 102. The major proportion of this, 420 tons per day, passes by means of line 103 controlled by valve 104 and is recirculated through lines 89 and 91 to oxidizing regenerator 13 as previously described. The remaining proportion of the partially reduced solids pass by means of line 20 controlled by valve 21 at a rate of 40 tons per day and is combined with the incoming low A. P. I. gravity hydrocarbon to be coked.

In this manner, a process for the active desulfurization of hydrocarbon fractions combined with a process for the production of large quantities of substantially pure hydrogen results. If desired, the hydrogen thus produced may be employed in hydrogenating the relatively unsaturated hydrocarbons present in the coker distillate. Preferably, this is carried out in a separate process either at high pressures and temperatures in the absence of a hydrogenation catalyst or at more moderate conditions of temperature and pressures in the presence of an active hydrogenation catalyst.

Although the foregoing description has been limited to the generation of hydrogen by the reaction of ferrous oxide (FeO) and steam and the coking of a low A. P. I. gravity sulfur-containing crude petroleum, it should be understood that these specific details are not to be considered as limiting the process of this invention to the specific conditions given since other hydrocarbon fractions such as those previously given may be employed. The conditions of operations described above, particularly the temperature conditions of the reducing regenerator, may be altered by increasing the temperature of reduction and the ratio of carbon monoxide to carbon dioxide in the recycle gas to a value of about 3.0 or to contain above about 75% carbon monoxide whereby the solids removed from the reducing regenerator contain appreciable quantities of elemental iron. The iron thus obtained is employed in substantially the same fashion as is the ferrous oxide (FeO) of the foregoing description by reacting it at an elevated temperature as a fluidized suspension with water vapor for hydrogen production. When employing elemental iron in this operation somewhat lower operating temperatures may be employed and the recycle rates necessary for a given hydrogen production may be decreased since the greater quantity of water is decomposed in oxidizing elemental iron to $Fe_3O_4$ than that obtained when ferrous oxide (FeO) is oxidized to $Fe_3O_4$.

The pressures involved in the process of this invention are moderate, that is, between atmospheric and about 250 pounds per square inch. The fluidized coker, reducing and oxidizing regenerators and the hydrogen generator may be efficiently operated at pressures of between 15 and 100 pounds per square inch gauge. It is to be understood, however, that these temperatures are typical of the operation described and are not intended to limit the scope of the invention.

Oxygen-containing gases employed in the process may be air or flue gases, or other gases containing free oxygen are also desirable since in the reducing regenerator in particular lower oxygen concentrations are desirable and must be carefully controlled.

It should also be understood that the process of this invention is not limited to the specific use of iron compounds in the reduction of water vapor for the production of hydrogen since other metals of atomic number 25 through 30 except copper, such as nickel, cobalt, manganese and the like, as well as mixtures and alloys of these metals and compounds of these metals such as their oxides may likewise be employed according to the principles of operation outlined above.

The use of zinc and zinc oxide in particular have been found to be suitable in hydrogen production according to this invention under substantially the same conditions given above for iron. Cobalt, nickel and manganese and their oxides may be employed also with little variation of the operation.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. A process which comprises coking a hydrocarbon oil in the presence of fluidized particles of a higher oxide of iron at a temperature between about 700° F. and about 1200° F. forming a coker distillate and coke-laden higher iron oxide particles, separating said coker distillate from said particles, subjecting said coke-laden particles to treatment at a temperature between about 1000° F. and about 1500° F. while in a fluidized state in a gas containing oxygen to effect the combustion of said coke therefrom and the direct heating and the carbon reduction of said higher iron oxide forming gases containing carbon monoxide and coke-free reduced iron-containing particles, fluidizing the particles thus obtained in steam at a temperature between about 800° F. and about 1500° F. to form hydrogen and thereby reforming the higher iron oxide, separating hydrogen thus produced and recirculating the higher iron oxide to contact further quantities of said hydrocarbon oil.

2. A process which comprises coking a hydrocarbon oil in the presence of fluidized particles of ferric oxide to form coke-laden ferric oxide particles and a coker distillate, separating said coke-laden particles from said coker distillate, fluidizing said coke-laden particles in a gas containing oxygen at an elevated temperature to effect the oxidation of said coke and the direct heating and carbon reduction of said particles of ferric oxide to form a gaseous mixture containing carbon monoxide and coke-free particles of ferrous oxide, maintaining a circulation of at least part of said carbon monoxide as a recycle gas containing a carbon monoxide to carbon dioxide molar ratio of at least 1.0 to fluidize said coke-laden ferric oxide particles, separating said ferrous oxide particles from said carbon monoxide gases, fluidizing the ferrous oxide particles in gas containing steam at an elevated temperature thereby reforming particles of ferric oxide while liberating hydrogen, separating hydrogen thus formed from particles of ferric oxide and recirculating the ferric oxide to contact further quantities of said hydrocarbon oil.

3. A process which comprises coking a hydrocarbon oil in the presence of fluidized particles of ferric oxide to form coke-laden ferric oxide particles and a coker distillate, separating said coke-laden particles from said coke-laden distillate, fluidizing said coke-laden particles in a gas containing oxygen at an elevated temperature sufficient to effect the oxidation of said coke and the direct heating and carbon reduction of said particles of ferric oxide to form particles of elemental iron and a gaseous mixture containing carbon monoxide, separating said elemental iron particles from said carbon monoxide gases, maintaining a circulation of said carbon monoxide gases as a recycle gas having a carbon monoxide to carbon dioxide ratio of at least 3.0 to fluidize said coke-laden ferric oxide particles to reduce uniformly said ferric oxide particles to elemental iron particles, subsequently fluidizing the elemental iron particles in gas containing steam at an elevated temperature thereby reforming particles of ferric oxide while liberating hydrogen, separating hydrogen thus formed from particles of ferric oxide and recirculating the ferric oxide to contact further quantities of said hydrocarbon oil.

4. A process which comprises coking a hydrocarbon oil contaminated with hydrocarbon compounds of sulfur in the presence of fluidized particles of $Fe_3O_4$ at a temperature between about 700° F. and about 1200° F. to form coke-laden particles of $Fe_3O_4$, iron sulfide and a coker distillate, separating the coker distillate thus formed from the aforementioned coke-laden particles, contacting said particles with a stripping gas to remove traces of said coker distillate, fluidizing said coke-laden particles at a temperature between about 1000° F. and about 1500° F. in a recycle gas containing a controlled quantity of carbon monoxide sufficient to permit the oxidation of said coke and the direct heating and reduction of said $Fe_3O_4$ to coke-free ferrous oxide and forming carbon monoxide from part of said coke in the presence of a gas containing oxygen, employing at least part of the gas thus formed as said recycle gas, separating the carbon monoxide thus formed, suspending carbon free particles of ferrous oxide and iron sulfide in a gas containing steam at a temperature between about 800° F. and about 1500° F. thereby decomposing at least a portion of said steam to liberate hydrogen and reform said particles of $Fe_3O_4$, separating the hydrogen thus formed from said particles, suspending said iron sulfide in a gas containing oxygen at a temperature between about 1000° F. and about 2000° F. thereby oxidizing said particles of iron sulfide forming a gas containing sulfur dioxide and combining the oxidized particles with said hydrocarbon oil to be coked.

5. A process which comprises combining a low A. P. I. gravity hydrocarbon oil contaminated by hydrocarbon compounds of sulfur with heated particles of $Fe_3O_4$ in weight ratios of from 1.0 to 10.0 tons of coke-free solids per ton of oil to effect a substantial degree of coking of said hydrocarbon oil to form a coker distillate and coke-laden particles of $Fe_3O_4$ and ferrous sulfide, separating the coker distillate thus formed from said coke-laden particles, fluidizing said coke-laden particles at an elevated temperature in a gas containing oxygen and a controlled quantity of carbon monoxide sufficient to permit the combustion of said coke and the direct heating and reduction of said particles of $Fe_3O_4$ to form coke-free particles of FeO and ferrous sulfide, combining the coke-free particles thus formed with a gas containing steam to form a fluidized suspension of said particles, maintaining the suspension at an elevated temperature thereby effecting a reaction beteen said FeO and said steam thereby liberating hydrogen and reforming particles of $Fe_3O_4$, separating said hydrogen from said particles of $Fe_3O_4$, recirculating a portion of particles of $Fe_3O_4$ and ferrous sulfide to be combined with said low A. P. I. gravity hydrocarbon oil, suspending the remaining portion of particles of $Fe_3O_4$ and ferrous sulfide in a gas containing oxygen to form a fluidized system, heating said mixture to oxidize said ferrous sulfide and $Fe_3O_4$ at an elevated temperature to $Fe_2O_3$ forming a gas containing sulfur dioxide, contacting the particles of $Fe_2O_3$ thus formed with a gas containing carbon monoxide thereby effecting a substantial reduction of particles of $Fe_2O_3$ to $Fe_3O_4$ and recirculating the particles of $Fe_3O_4$ formed to contact further quantities of said hydrocarbon oil to be coked.

6. A process according to claim 5 wherein said coke-laden particles of $Fe_3O_4$ and ferrous sulfide are reduced in a reducing regenerator zone to form coke-free particles of FeO and ferrous sulfide by fluidizing said particles in a recycle gas produced in said reducing regenerator zone and having a carbon monoxide to carbon dioxide ratio of at least 1.0 and a controlled quantity of oxygen and which is recirculated through said reducing regenerator zone.

7. A process according to claim 5 wherein heat is supplied to effect the reduction of $Fe_3O_4$ to FeO which comprises separating particles of $Fe_3O_4$ and ferrous sulfide from said hydrogen, suspending the particles thus separated in flue gas at an elevated temperature thereby heating said particles and combining the thus heated particles of $Fe_3O_4$ and ferrous sulfide with the coke-laden particles of $Fe_3O_4$ and ferrous sulfide.

8. A process which comprises establishing a coking zone, a fluidized reducing regeneration zone, a fluidized hydrogen generation zone and a fluidized oxidizing regeneration zone, maintaining a level of suspended solids in each of said fluidized zones, contacting a low A. P. I. gravity hydrocarbon oil contaminated with hydrocarbon compounds of sulfur with heated particles of $Fe_3O_4$ and FeS in a ratio of from 5 to 50 tons of solids per ton of oil to effect a substantial degree of coking of said hydrocarbon oil to form coke-laden particles of $Fe_3O_4$ and FeS and a coker distillate within said coking zone, separating said coker distillate from said coking zone, passing coke-laden particles of $Fe_3O_4$ and FeS from said coking zone into said fluidized reducing regeneration zone, introducing a gas containing oxygen into said reducing regeneration zone thereby maintaining an elevated temperature therein by oxidation of said coke and the direct heating of said particles causing the reduction of said $Fe_3O_4$ forming coke-free particles of FeO and FeS and a gas containing carbon monoxide, recirculating a portion of carbon monoxide bearing gases thus formed through said fluidized reducing regeneration zone while controlling the ratio of carbon monoxide to carbon dioxide thereof, removing coke-free particles of FeO and FeS from said reducing zone, combining said particles at an elevated temperature with a gas containing steam in said fluidized hydrogen generation zone, reacting said FeO with said steam to form hydrogen and reforming said $Fe_3O_4$, separating the hydrogen thus produced, combining a first portion of the heated particles of $Fe_3O_4$ and FeS thus produced with said low A. P. I. gravity hydrocarbon oil to be coked, suspending a second portion of said particles in heated flue gas thereby heating said particles which are subsequently introduced into said reducing regeneration zone, suspending the remaining portion of particles of $Fe_3O_4$ and FeS in a gas containing oxygen, introducing this suspension into said fluidized oxidizing regeneration zone thereby effecting the oxidation of said particles to $Fe_2O_3$ forming gases containing sulfur dioxide, contacting particles of $Fe_2O_3$ thus formed with a gas containing carbon monoxide produced from said fluidized reducing zone thereby converting said $Fe_2O_3$ to $Fe_3O_4$ and combining the particles of $Fe_3O_4$ thus formed with said low A. P. I. gravity hydrocarbon oil to be coked.

9. A process according to claim 8 which comprises a fluidized coking zone into which said low A. P. I. gravity hydrocarbon oil combined with heated particles of Fe₃O₄ and FeS is introduced, maintaining a level of suspended coke-laden particles therein, separating a coker distillate therefrom, separating coke-laden particles of Fe₃O₄ and FeS therefrom and introducing the coke-laden particles thus produced into said fluidized reducing regeneration zone.

10. A process according to claim 8 wherein said low A. P. I. gravity hydrocarbon oil is coked at a temperature between about 700° F. and 1200° F., said coke-laden Fe₃O₄ is reduced to FeO at a temperature of from 1000° F. to about 1500° F. in the presence of a recycle gas having a carbon monoxide to carbon dioxide ratio of at least 1.0, wherein said fluidized hydrogen generation zone is operated at a temperature of from about 800° F. to above about 1500° F. and wherein said fluidized oxidizing regeneration zone is operated at a temperature between about 1000° F. and about 2000° F.

11. A process according to claim 8 wherein said coking zone, said fluidized reducing regeneration zone, said fluidized oxidizing regeneration zone, and said fluidized hydrogen generation zone are operated at pressures of from about 15 to about 200 pounds per square inch gauge.

12. An apparatus for the production of hydrogen which comprises in combination a hydrogen generation vessel, a reducing regeneration vessel and an oxidizing regeneration vessel, an outlet conduit for gases from the top of each of said vessels, an outlet conduit for solids from the bottom of each of said vessels, an inlet conduit for fluids containing suspended solids into each of said vessels, a conduit for recirculating part of the solids removed from said outlet conduit from each of said vessels into the inlet conduit of the same vessel, a coking vessel, an inlet conduit for hydrocarbon and suspended solids into said coking vessel, two conduits for solids, one each from the bottom of said hydrogen generation and oxidizing regeneration vessels opening into said inlet conduit into said coking vessel, an outlet conduit for a pyrolyzed hydrocarbon from the top of said coking vessel, an outlet conduit for solids from said coking vessel opening into the inlet conduit into said reducing regeneration vessel, said outlet conduit for solids from the bottom of said reducing regeneration vessel opening into said inlet conduit for steam into the bottom of said hydrogen generation vessel and a conduit communicating the outlet conduit for solids from said hydrogen generation vessel and the inlet conduit into the bottom of said oxidizing regeneration vessel.

13. An apparatus for the production of hydrogen which comprises a coking vessel, a reducing regeneration vessel, a hydrogen generation vessel and an oxidizing regeneration vessel, an inlet conduit for hot suspended solids and a hydrocarbon to be pyrolyzed opening into said coking vessel, an outlet from the top thereof for a pyrolyzed hydrocarbon vapor, an outlet conduit for coke-laden solids from the bottom thereof communicating with an inlet conduit for air and suspended coke-laden solids opening into the bottom of said reducing regeneration vessel, a conduit for recirculated gases communicating the top with the bottom thereof, an outlet conduit for gases from the top thereof, an outlet conduit for solids from the bottom thereof communicating with an inlet conduit for steam and suspended solids opening into the bottom of said hydrogen generation vessel, a conduit for recirculated gases communicating the top with the bottom thereof, an outlet conduit for gases from the top thereof, an outlet conduit for solids therefrom communicating with said inlet conduit for hydrocarbon into said coking vessel and also communicating with an inlet conduit for air and suspended solids into the bottom of said oxidizing regeneration vessel, a conduit for recirculated gases communicating the top with the bottom thereof, an outlet conduit for gases from the top thereof, an outlet conduit for solids from the bottom thereof communicating with the inlet conduit for hydrocarbon into said coking vessel and conduits for recirculated solids communicating the outlet conduits for solids from each of said reducing regeneration, hydrogen generation and oxidizing regeneration vessels communicating with said inlet conduits of the same vessel.

14. An apparatus according to claim 13 in combination with a conduit for recirculated vapors communicating the top with the bottom of said coking vessel and wherein said inlet conduit for said hydrocarbon and suspended solids enters the bottom of said coking vessel.

15. An apparatus which comprises a coking vessel, a reducing regeneration vessel, an oxidizing regeneration vessel and a hydrogen generation vessel, said vessels being adapted to contacting entering gases with fluidized solid particles, each of said reducing regeneration, oxidizing regeneration and hydrogen generation vessels being provided with means for removing solids therefrom by gravity and means for recirculating said solids in suspension to the same vessel, an inlet conduit for heated solid particles and a hydrocarbon oil opening into said coking vessel, an outlet conduit therefrom for a coker distillate, a conduit therefrom for coke-laden solids, an inlet conduit for said coke-laden solids from said coking vessel opening into said reducing regeneration vessel, conduit and blower means for removing from the top thereof and recirculating a carbon monoxide bearing gas into the bottom of said reducing regenerator vessel, an outlet conduit for coke-free reduced particles therefrom communicating with the inlet conduit for said reduced particles into said hydrogen generation vessel, an outlet conduit for hydrogen product therefrom, an outlet conduit for spent solid particles therefrom communicating with an inlet conduit for one portion of said spent solid particles into said oxidizing regeneration vessel and with an inlet conduit for another portion of said spent solid particles into said coking vessel and a conduit for oxidized particles communicating said oxidizing regeneration vessel with said inlet conduit to said coking vessel.

16. An apparatus for the production of hydrogen which comprises in combination a hydrogen generation vessel, a reducing regeneration vessel and a hydrocarbon coking vessel, an outlet conduit for gases and vapors from the top of each of said vessels, an outlet conduit for solids from the bottom of each of said vessels, an inlet conduit for fluids containing suspended solids into each of said vessels, a conduit for recirculating part of the solids removed from said outlet conduit from each of said vessels into the inlet conduit of the same vessel, means for introducing a hydrocarbon oil and suspended solids through said inlet conduit of said coking vessel, a conduit for solids communicating the bottom of said hydrogen generation vessel with the inlet conduit into said coking vessel, a conduit for coke-laden solids communicating the solids outlet of said coking vessel with said reducing regeneration vessel, said outlet conduit for solids from the bottom of said reducing regeneration vessel opening into said inlet conduit opening into the bottom of said hydrogen generation vessel.

17. An apparatus for the production of hydrogen which comprises in combination a hydrogen generation vessel, a reducing regeneration vessel and a hydrocarbon coking means, an outlet conduit for gases and vapors from the top of each of said vessels, an outlet conduit for solids from the bottom of each of said vessels, an inlet conduit for fluids containing suspended solids into each of said vessels, means for introducing a hydrocarbon oil and suspended solids through the inlet conduit for fluids containing suspended solids into said coking means, a conduit for solids communicating the bottom of said hydrogen generation vessel with the inlet conduit into said coking means, a conduit for coke-laden solids communicating the solids outlet of said coking means with said reducing regeneration vessel, said outlet conduit for solids from the bottom of said reducing regeneration vessel opening into said inlet conduit opening into the bottom of said hydrogen generation vessel and means for recirculating into said inlet to said reducing regeneration vessel part of the gases removed from said outlet for gases thereof.

HOMER C. REED.
CLYDE H. O. BERG.

References Cited in the file of this patent

UNITED STATES PATENTS

| Number | Name | Date |
|---|---|---|
| 2,273,297 | Szayna | Feb. 17, 1942 |
| 2,296,522 | Hartley | Sept. 22, 1942 |
| 2,348,418 | Roesch et al. | May 9, 1944 |
| 2,407,371 | Jahnig | Sept. 10, 1946 |
| 2,449,635 | Barr | Sept. 21, 1948 |

OTHER REFERENCES

Taylor: "Industrial Hydrogen," 1921, Chemical Catalog Co., Inc., New York, page 52.